United States Patent
Shin

(10) Patent No.: US 11,524,370 B2
(45) Date of Patent: Dec. 13, 2022

(54) TURBINE BLADE REPAIR METHOD USING ADDITIVE MANUFACTURING

(71) Applicant: DOOSAN ENERBILITY CO., LTD, Changwon (KR)

(72) Inventor: Young Ho Shin, Changwon (KR)

(73) Assignee: DOOSAN ENERBILITY CO., LTD., Changwon (KR)

( * ) Notice: Subject to any disclaimer, the term of this patent is extended or adjusted under 35 U.S.C. 154(b) by 0 days.

(21) Appl. No.: 17/552,479

(22) Filed: Dec. 16, 2021

(65) Prior Publication Data

US 2022/0105594 A1    Apr. 7, 2022

Related U.S. Application Data

(62) Division of application No. 17/212,064, filed on Mar. 25, 2021, now Pat. No. 11,400,550.

(30) Foreign Application Priority Data

Mar. 27, 2020  (KR) .................. 10-2020-0037317
Mar. 27, 2020  (KR) .................. 10-2020-0037319

(51) Int. Cl.
  *B23P 6/00*   (2006.01)
  *F02C 7/00*   (2006.01)

(52) U.S. Cl.
  CPC .............. *B23P 6/005* (2013.01); *B23P 6/007* (2013.01); *F02C 7/00* (2013.01); *F05D 2220/32* (2013.01); *F05D 2230/80* (2013.01); *F05D 2260/22141* (2013.01); *Y10T 29/49318* (2015.01); *Y10T 29/49734* (2015.01)

(58) Field of Classification Search
  CPC .......... B33Y 40/20; B23P 6/005; B23P 6/007; Y10T 29/49318; Y10T 29/49734; F05D 2220/80
  See application file for complete search history.

(56) References Cited

U.S. PATENT DOCUMENTS 6,477,773 B1  11/2002  Wilson
7,010,987 B2   3/2006  Antonelli
7,472,478 B2   1/2009  Graham
(Continued)

FOREIGN PATENT DOCUMENTS

JP      2003530504 A    10/2003
WO      2018156255 A1    8/2018
WO   WO-2019226815 A1 * 11/2019  .............. B22F 10/10

OTHER PUBLICATIONS

EESR dated Nov. 12, 2021.
KR NOA dated Aug. 26, 2021.
US NFOA dated Jan. 20, 2022.

*Primary Examiner* — Jason L Vaughan
(74) *Attorney, Agent, or Firm* — Harvest IP Law LLP

(57) ABSTRACT

A turbine blade repair method is provided. The turbine blade repair method includes quantizing a position and a shape of a damaged portion of a turbine blade into numerical values, calculating a momentum loss of the turbine blade due to removal of the damaged portion, modeling a shape of a repair portion to replace the damaged portion so that the repair portion has the same momentum as the damaged portion, removing the damaged portion, and forming the modeled repair portion by performing an additive manufacturing at a position of the removed damaged portion.

10 Claims, 17 Drawing Sheets

(56) References Cited

U.S. PATENT DOCUMENTS

| | | | |
|---|---|---|---|
| 7,797,828 B2 | 9/2010 | Beeson | |
| 8,881,392 B2 | 11/2014 | Derrien | |
| 9,777,574 B2 | 10/2017 | Navale | |
| 10,487,660 B2 | 11/2019 | Lacy | |
| 11,154,956 B2* | 10/2021 | Garay | C30B 29/52 |
| 2006/0067830 A1 | 3/2006 | Guo | |
| 2009/0090767 A1 | 4/2009 | Bouse | |
| 2009/0252987 A1 | 10/2009 | Greene, Jr. | |
| 2015/0034266 A1* | 2/2015 | Bruck | B22D 19/10 164/76.1 |
| 2015/0184514 A1 | 2/2015 | Schmitt | |
| 2016/0047244 A1 | 2/2016 | Navale | |
| 2017/0144219 A1 | 5/2017 | Xu | |
| 2017/0368647 A1 | 12/2017 | Bunker | |
| 2018/0236556 A1* | 8/2018 | Garay | B22F 7/062 |
| 2019/0314895 A1* | 10/2019 | Hildreth | C25F 3/00 |
| 2021/0395915 A1* | 12/2021 | Hansal | B22F 10/43 |

\* cited by examiner

TURBINE BLADE REPAIR METHOD USING ADDITIVE MANUFACTURING

CROSS REFERENCE TO RELATED APPLICATIONS

This is a divisional of U.S. application Ser. No. 17/212,064 filed Mar. 25, 2021, which claims priority to Korean Patent Application No. 10-2020-0037317, filed on Mar. 27, 2020 and Korean Patent Application No. 10-2020-0037319, filed on Mar. 27, 2020, the disclosures of which are incorporated herein by reference in their entireties.

FIELD

Apparatuses and methods consistent with exemplary embodiments relate to a turbine blade repair method using additive manufacturing and, more particularly, to a method of repairing damage to a squealer of a turbine blade using additive manufacturing or stably forming a secondary structure on a single-crystal structure, such as a turbine blade, using additive manufacturing.

BACKGROUND

Turbine blades used in power generation equipment are key components that convert energy from a fluid such as steam or air into mechanical energy, and are continuously exposed to high-temperature fluid flow environments. Thus, damage to the turbine blades is inevitable, and damaged portions must be repaired.

In addition, there are cases in which it is necessary to add a secondary structure on top of turbine blades to improve vibration characteristics of turbine blades or increase the strength of turbine blades. This work of improving the performance of a fully assembled turbine blades may be included in the meaning of repair in a broad sense.

Because turbine blades have to withstand high-temperature and high-stress conditions, turbine blades are generally made of a special material, such as a single-crystal superheat-resistant alloy, a superalloy, or titanium (Ti), highly resistant to oxidation, creep deformation, corrosion, and fracture. Due to the characteristics of materials that are difficult to machine, it is difficult to realize the same shape and physical properties as before repair.

For example, if a crack occurs in the squealer of a turbine blade, a shelf connected to the squealer may also be removed when the crack is removed. It is significantly difficult to machine a superalloy or Ti with the same shape as before repair in a related art machining process. In contrast, if a material that is easy to process is used, the physical characteristics of a repair portion may be degraded than those of the peripheral portions, thereby increasing the possibility of other damage. Further, because the material of the repair portion is different from the material before repair, the momentum of the entire turbine blade may be changed, which may adversely affect the stability and the efficiency of a gas turbine.

In addition, if a secondary structure is directly formed on the turbine blade, a high-energy laser beam is emitted to a portion adjacent to a surface of the turbine blade. Thus, thermal impact may be applied to the surface of the turbine blade. The thermal impact may change physical characteristics of the turbine blade and degrade the performance of a turbine engine. Accordingly, there is a need for a method capable of stably forming a secondary structure on a single-crystal structure, such as a turbine blade, without thermal impact.

BRIEF DESCRIPTION

Aspects of one or more exemplary embodiments provide a turbine blade repair method using additive manufacturing, the method being able to easily repair a component of mechanical equipment, such as a squealer of a turbine blade, which is difficult to repair due to the characteristics or shape of the material.

Aspects of one or more exemplary embodiments also provide a method capable of stably forming a secondary structure on a single-crystal structure, such as a turbine blade, without thermal impact.

Additional aspects will be set forth in part in the description which follows and, in part, will become apparent from the description, or may be learned by practice of the exemplary embodiments.

According to an aspect of an exemplary embodiment, there is provided a turbine blade repair method including: quantizing a position and a shape of a damaged portion of a turbine blade into numerical values; calculating a momentum loss of the turbine blade due to removal of the damaged portion; modeling a shape of a repair portion to replace the damaged portion so that the repair portion has the same momentum as the damaged portion; removing the damaged portion; and forming the modeled repair portion by performing an additive manufacturing at a position of the removed damaged portion.

The additive manufacturing may include a process selected from among selective laser sintering, selective laser melting, electron beam melting, direct energy deposition, binder jetting, and fused deposition modeling.

The turbine blade may include a pair of squealers facing each other to form a cavity therein and a shelf connecting the squealers. The damaged portion may be a crack that has propagated from a distal end of at least one of the squealers to a height lower than a bottom surface of the shelf.

The removing of the damaged portion may include removing an entire shelf by cutting the turbine blade in a direction parallel to the shelf.

The modeling of the shape of the repair portion may be performed so that the bottom surface of the shelf has a curved shape.

The removing of the damaged portion may include removing a portion of the shelf by cutting the turbine blade to have an angle of inclination with respect to the bottom surface of the shelf.

The forming of the repair portion may include performing the additive manufacturing by inclining the turbine blade from which the damaged portion is removed at an angle equal to the angle of inclination.

The modeling of the shape of the repair portion may be performed so that rounded chamfers are formed at boundaries between the squealers and the shelf.

The quantizing may include detecting the damaged portion by performing a nondestructive test on the turbine blade.

The turbine blade and the repair portion may be made of the same material.

According to an aspect of another exemplary embodiment, there is provided a turbine blade repair method using an additive manufacturing, the method including: setting an imaginary area in which a secondary structure is formed in a single-crystal structure; forming a heat dissipating structure in the single-crystal structure, wherein the heat dissipating structure includes a plurality of heat dissipating fins extending radially from the set imaginary area; forming a second structure in the imaginary area; and removing the heat dissipating structure.

The forming of the second structure may be performed by the additive manufacturing.

The additive manufacturing may include a process selected from among selective laser sintering, selective laser melting, electron beam melting, direct energy deposition, and fused deposition modeling.

The heat dissipating structure may be made of a material having a lower melting point than the secondary structure.

The removing of the heat dissipating structure may include selectively melting the heat dissipating structure by heating the heat dissipating structure.

The heat dissipating structure may contain copper.

Each of the plurality of heat dissipating fins extending from the imaginary area may have a length greater than a width, and the width is 0.2 mm or greater.

The forming of the heat dissipating structure may include: forming a plurality of first heat dissipating fins extending radially from the set imaginary area; and forming a plurality of second heat dissipating fins each extending in a transverse direction from a corresponding first heat dissipating fin among the plurality of first heat dissipating fins.

The forming of the heat dissipating structure may further include forming a plurality of third heat dissipating fins each extending in the transverse direction from a corresponding second heat dissipating fin among the plurality of second heat dissipating fins.

The single-crystal structure may include a turbine blade of a gas turbine.

The turbine blade repair method using an additive manufacturing (AM) according to one or more exemplary embodiments may easily repair a damaged turbine blade using a material which is difficult to machine, such as a superalloy or titanium (Ti), by introducing the additive manufacturing method. For example, the turbine blade may be repaired to have the same shape regardless of the position or size of a damaged portion, and the momentum of the turbine blade may be maintained to be the same before and after the repair.

In addition, because the shape of the repair portion may be appropriately changed while maintaining the same amount of momentum, the performance of the turbine blade may be improved by, for example, removing stress concentration.

Further, the turbine blade repair method using an additive manufacturing according to another exemplary embodiments forms a secondary structure after forming the heat dissipating structure that can be easily removed in advance, so that heat generated during the formation of the secondary structure may be effectively dissipated to outside. Accordingly, if the secondary structure is formed in a single-crystal structure of a turbine blade, it is possible to minimize thermal impact applied to the single-crystal structure.

BRIEF DESCRIPTION OF THE DRAWINGS

The above and other aspects will be more clearly understood from the following description of the exemplary embodiments with reference to the accompanying drawings, in which.

DETAILED DESCRIPTION

Figure 1:
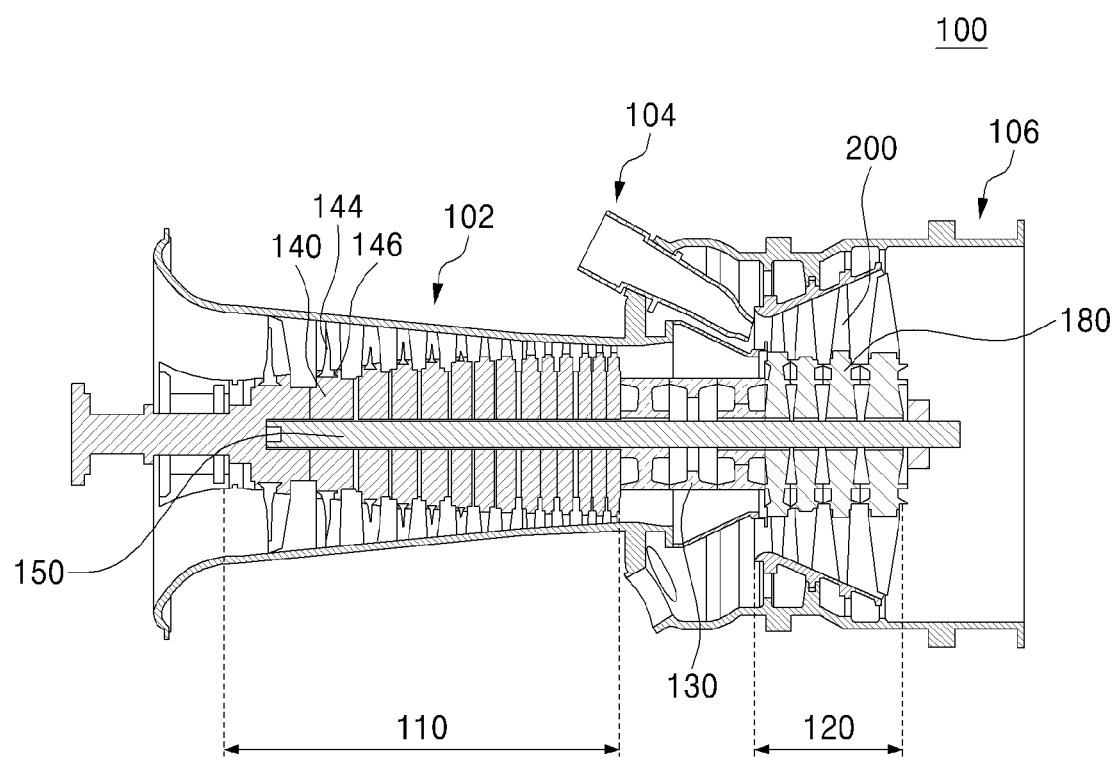
FIG. 1 is a cross-sectional view illustrating a schematic structure of a gas turbine according to an exemplary embodiment.

Various modifications and various embodiments will be described in detail with reference to the accompanying drawings so that those skilled in the art can easily carry out the disclosure. It should be understood, however, that the various embodiments are not for limiting the scope of the disclosure to the specific embodiment, but they should be interpreted to include all modifications, equivalents, and alternatives of the embodiments included within the spirit and scope disclosed herein.

Terms such as "first," "second," and so on may be used to describe a variety of components, but the components should not be limited by these terms. These terms may be merely used to distinguish one component from other components. The use of such ordinal numbers should not be construed as limiting the meaning of the term. For example, the components associated with such an ordinal number should not be limited in the order of use, placement order, or the like. If necessary, each ordinal number may be used interchangeably.

It will be understood that when it is described that a certain element is "connected" or "linked" to another element, not only can it be "directly connected or linked" to the other element but it can also be "indirectly connected or linked" to the other element via an "intervening" element. In contrast, when it is described that a certain element is "directly connected or linked" to another element, it will be understood that there is no intervening element therebetween. The same should be applied to other expressions rendering the relationship between elements, such as "between", "directly between", "adjacent to" and "directly adjacent to".

Terminologies used herein are for the purpose of describing specific embodiments only, and are not intended to limit the scope of the disclosure. The singular forms are intended to include plural forms as well, unless the context clearly indicates otherwise. In the disclosure, the terms such as "comprise", "include", "have" should be construed as designating that there are such features, integers, steps, operations, elements, components, and/or combinations thereof, but do not preclude the presence or addition of one or more other features, integers, steps, operations, elements, components, or combinations thereof.

Unless otherwise defined, all terms including technical and scientific terms used herein have the same meaning as commonly understood by those skilled in the art to which the present disclosure belongs. It will be further understood that terms, such as those defined in commonly used dictionaries, should be interpreted as having meanings that are consistent with their meanings in the context of the relevant art and will not be interpreted in an idealized or overly formal sense unless expressly so defined herein.

Hereinafter, exemplary embodiments of the present disclosure will be described in more detail with reference to the accompanying drawings. In the accompanying drawings, the same reference numerals will be used to designate the same components, and repeated descriptions thereof will be omitted.

Figure 2:
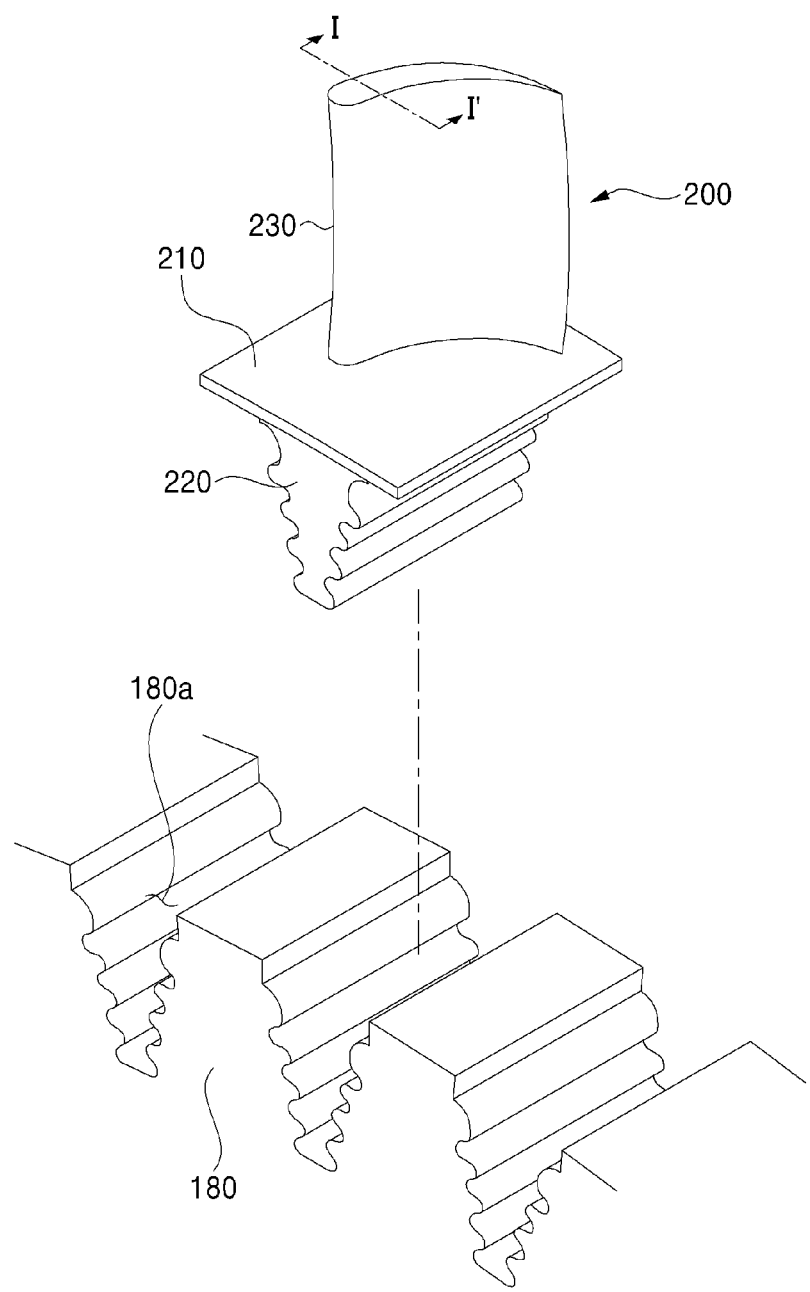
FIG. 2 is a perspective view illustrating a rotor disk and a turbine blade illustrated in FIG. 1.
Figure 3:
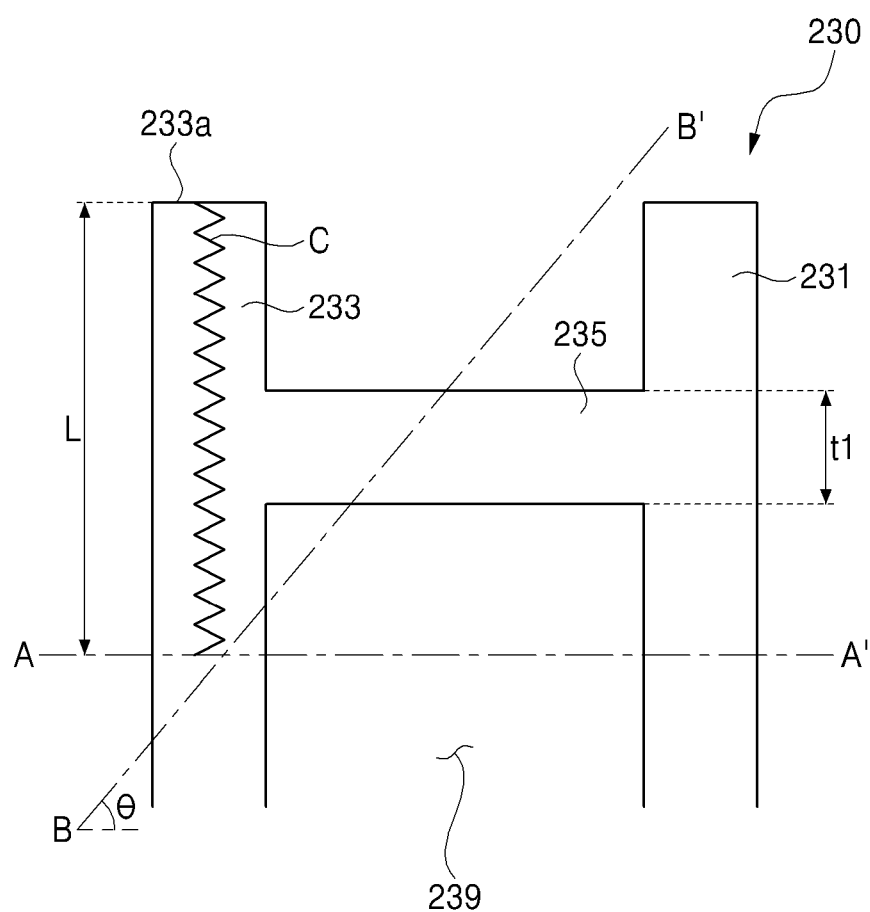
FIG. 3 is a cross-sectional view illustrating a top portion of the turbine blade taken along line I-I' in FIG. 2.
Figure 4:
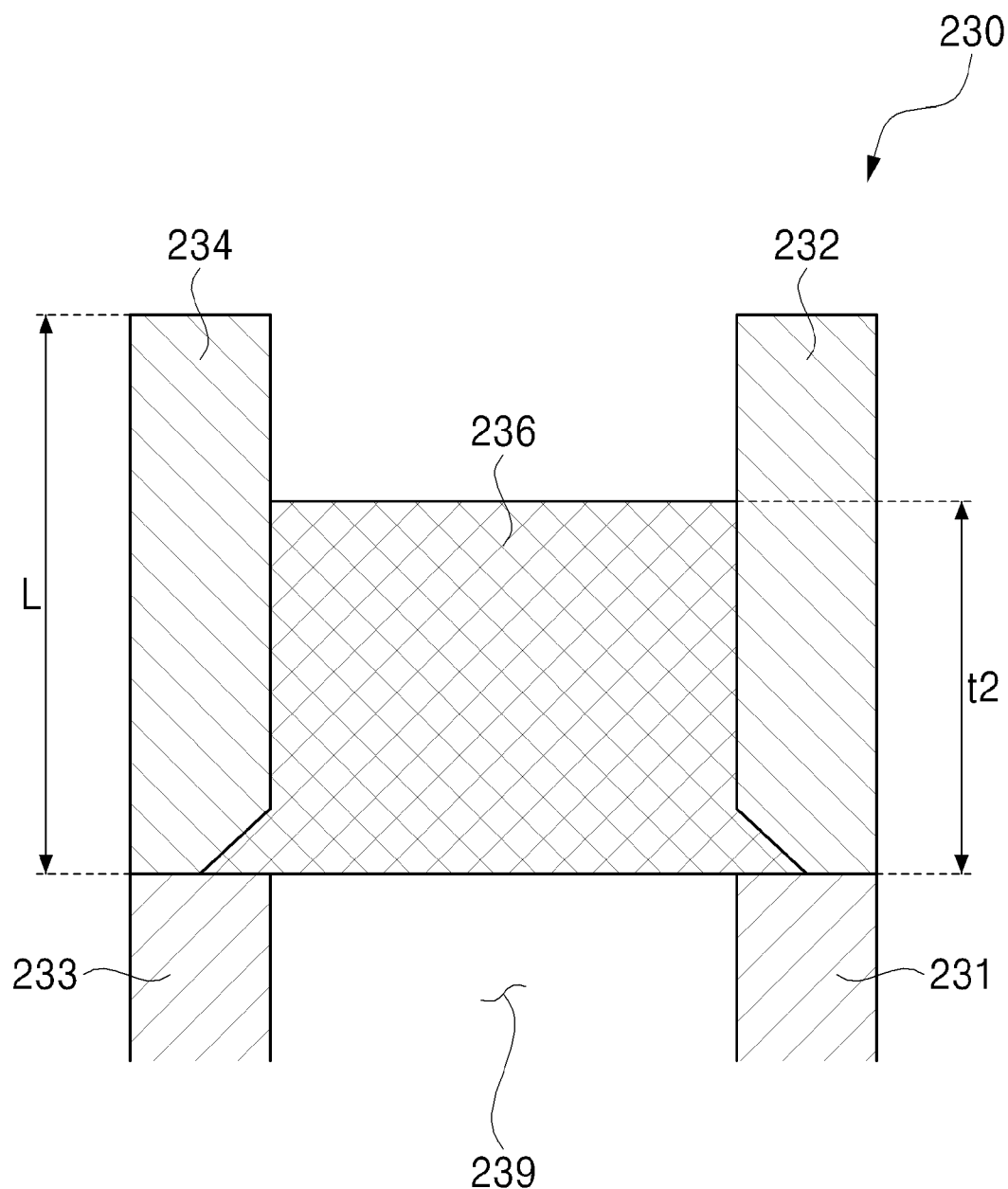
FIG. 4 is a view illustrating a turbine blade repair method of a related art.

FIG. 1 is a cross-sectional view illustrating a schematic structure of a gas turbine according to an exemplary embodiment, FIG. 2 is a perspective view illustrating a rotor disk and a turbine blade illustrated in FIG. 1, FIG. 3 is a cross-sectional view illustrating a top portion of the turbine blade taken along line I-I' in FIG. 2, and FIG. 4 is a view illustrating a turbine blade repair method of a related art.

Referring to FIG. 1, a gas turbine 100 includes a housing 102, a compressor section 110 and a turbine section 120 provided inside the housing 102, a combustor 104, and an exhaust diffuser 106.

The compressor section 110 provided in a front end of the housing 102 is configured to compress air and supply the compressed air to the combustor 104. The combustor 104 generates combustion gas using a mixture of the compressed air and fuel and supplies the combustion gas to the turbine 120. The turbine section 120 provided in a rear end of the housing 102 is configured to generate rotational force using combustion gas supplied from the combustor 104. A portion of the rotational force generated by the turbine section 120 may be transmitted to the compressor section 110 through a torque tube 130.

The compressor section 110 includes a plurality of compressor rotor disks 140. The plurality of compressor rotor disks 140 may be pressed against each other by a tie rod 150, thereby preventing the adjacent compressor rotor disks from rotating separately.

A plurality of compressor blades 144 is radially provided on an outer circumference of each of the compressor rotor disks 140. The compressor blades 144 may be coupled to each of the compressor rotor disks 140 through compressor roots 146.

In addition, a plurality of compressor vanes are fixedly arranged between each of the compressor rotor disks 140. While the compressor rotor disks 140 rotate along with a rotation of the tie rod 150, vanes fixed to the housing 102 do not rotate. The compressor vanes guide the flow of compressed air moved from front-stage compressor blades 144 of the compressor rotor disk 140 to rear-stage compressor blades 144 of the compressor rotor disk 140. Here, terms "front" and "rear" may refer to relative positions determined based on the flow direction of compressed air.

A coupling scheme of the compressor roots 146 which are coupled to the compressor rotor disks 140 is classified into a tangential-type and an axial-type. This may be selected depending on a structure of the gas turbine to be used, and may have a dovetail structure or a fir tree structure. In some cases, the compressor blade 1110 may be coupled to the compressor rotor disk 1120 by using other types of coupling device, such as a key or a bolt.

The tie rod 150 may be a single or multi-tie rod structure. One end of the tie rod 150 is coupled to the compressor rotor disk 140 that is disposed at the most upstream side, and the other end thereof is coupled with a fastening nut. It is understood that the shape of the tie rod 150 is not limited to example illustrated in FIG. 1, and may be changed or vary according to one or more other exemplary embodiments. For example, a single tie rod may be disposed passing through central portions of the rotor disks, a plurality of tie rods may be arranged in the shape of a cylinder, or a combination thereof is also possible.

The combustor 104 may mix fuel with air compressed in the compressor section 110 and generate high-temperature and high-pressure combustion gas by combustion. The combustor 104 may include a burner including a fuel injector nozzle, a combustor liner defining a combustion chamber, and a transition piece connecting the combustor 104 and the turbine section 120. In addition, a plurality of combustors constituting the combustor 104 may be arranged in a housing in a form of a cell.

The high-temperature and high-pressure combustion gas generated by the combustor 104 may be supplied to the turbine section 120. The high-temperature and high-pressure combustion gas expands and applies impingement or reaction force to the turbine blades 200 to generate rotational torque. A portion of the rotational torque is supplied to the compressor section 110 through the torque tube 130, and the remaining portion which is the excessive torque is used to drive a power generator or the like.

The turbine section 120 basically has a structure similar to that of the compressor section 110. That is, the turbine section 120 may include a plurality of turbine rotor disks 180 and a plurality of turbine blades 200 radially coupled to each of the turbine rotor disks 180. Here, the turbine blades 200 may be coupled to the turbine rotor disks 180 in a dovetail manner, and turbine vanes fixed to the housing may be provided between the turbine blades 200 of the adjacent turbine rotor disks 180 to guide a flow direction of combustion gas passing through the turbine blades 200.

Each of the turbine rotor disks 180 may have a disk shape, and a plurality of coupling slots 180a may be formed on an outer circumferential surface thereof.

Each of the turbine blades 200 includes a flat platform 210, a root 220 provided below the platform 210, and a blade portion 230 provided above the platform 210.

The platforms 210 of the adjacent turbine blades 200 may be in contact with each other, thereby constantly maintaining distances between the adjacent turbine blades 200.

The root 220 has a shape corresponding to a shape of each of the coupling slots 180a of the turbine rotor disks 180, and is configured to firmly couple the turbine blade 200 to the turbine rotor disk 180.

The blade portion 230 has an airfoil-shaped cross-section having a cavity 239 defined therein. A shape and magnitude of the blade portion 230 may vary depending on the specification of the gas turbine 100. The blade portion 230 may have a leading edge located upstream and a trailing edge located downstream with respect to a flow direction of combustion gas. In addition, the blade portion 230 may have a pressure side to which combustion gas directly collides and a suction side opposite the pressure side. The pressure side and the suction side having constant thicknesses extend to form an overall shape of an airfoil of which interior is hollow for cooling.

Because the blade portion 230 is required to have high mechanical strength, high thermal creep resistance, and high corrosion resistance, the blade portion 230 may be made from a superalloy, titanium (Ti), or the like. The superalloy may be, for example, Rene alloy, such as Rene 108, CM247, Hastelloy, Waspaloy, Haynes alloy, Incoloy, MP98T, TMS alloy, CMSZ single-crystal alloy, or the like.

Because the blade portion 230 is a component that directly contacts high-temperature and high-pressure combustion gas, there is high possibility of component damage. For example, there is high possibility that a tip 233a, i.e., a distal end of the blade portion 230, may be damaged.

FIG. 3 is a cross-sectional view illustrating a top portion of the turbine blade taken along line I-I' in FIG. 2. FIG. 3 illustrates a case in which a crack C has occurred in the tip 233a of the blade portion 230. Referring to FIG. 3, the top end of the blade portion 230 may include squealers 231 and 233, the cavity 239 defined between the squealers 231 and 233, and a shelf 235 connecting the squealers 231 and 233. For example, the squealer on the pressure side to which combustion gas directly collides is referred to as a first squealer 231, and the squealer on the suction side is referred to as a second squealer 233.

It is assumed that a crack C started from a tip 233a of the second squealer 233 and propagated to the second squealer 233 to a position lower than a bottom surface of the shelf 235.

Referring to FIG. 4, in the related art, an entire portion above A-A' line in FIG. 3 has been removed so that the entire crack C may be removed, and new squealers 232 and 234 and a new shelf 236 have been formed on the removed portion. Here, components newly attached by a repair process are referred to as a third squealer 232, a fourth squealer 234, and a second shelf 236.

In this case, because it is difficult to machine a special material such as superalloy or Ti into a complicated shape, the third squealer 232, the fourth squealer 234, and the second shelf 236 have generally been made of a material different from the existing components 231, 233, and 235. For example, the repair process has been performed by forming the third squealer 232, the fourth squealer 234, and the second shelf 236 from an alloy material that can be machined such as cutting, and then welding the third squealer 232, the fourth squealer 234, and the second shelf 236 to the top surfaces of the first and second squealers 231 and 233.

However, because the substitute components 232, 234, and 236 are made of a different material from the existing components 231, 233, and 235, there is a problem that physical properties of the blade portion 230 may be different from those before the repair. For example, the total mass of the blade portion 230 after the repair is changed from before the repair. This may cause a change in the momentum of the blade portion 230. In order to overcome this problem, a method of increasing a thickness t2 of the repaired shelf 236 to be larger than a thickness t1 of the existing shelf 235, a method of changing the position of the shelf, or the like has been used. However, a change in the thickness of the repaired component or the position of the shelf may cause a change in dynamics of the entire blade portion 230 or cause a serious problem in the stability or performance of the gas turbine 100. The present disclosure has been devised to overcome the problems of the related art. For example, according to the present disclosure, a repair portion is made of the same material by additive manufacturing (AM), and the repair portion is formed to maintain the same momentum even when the repair portion is made of different materials, thereby improving manufacturing performance and mechanical properties compared to the related-art manufacturing method.

Figure 5:
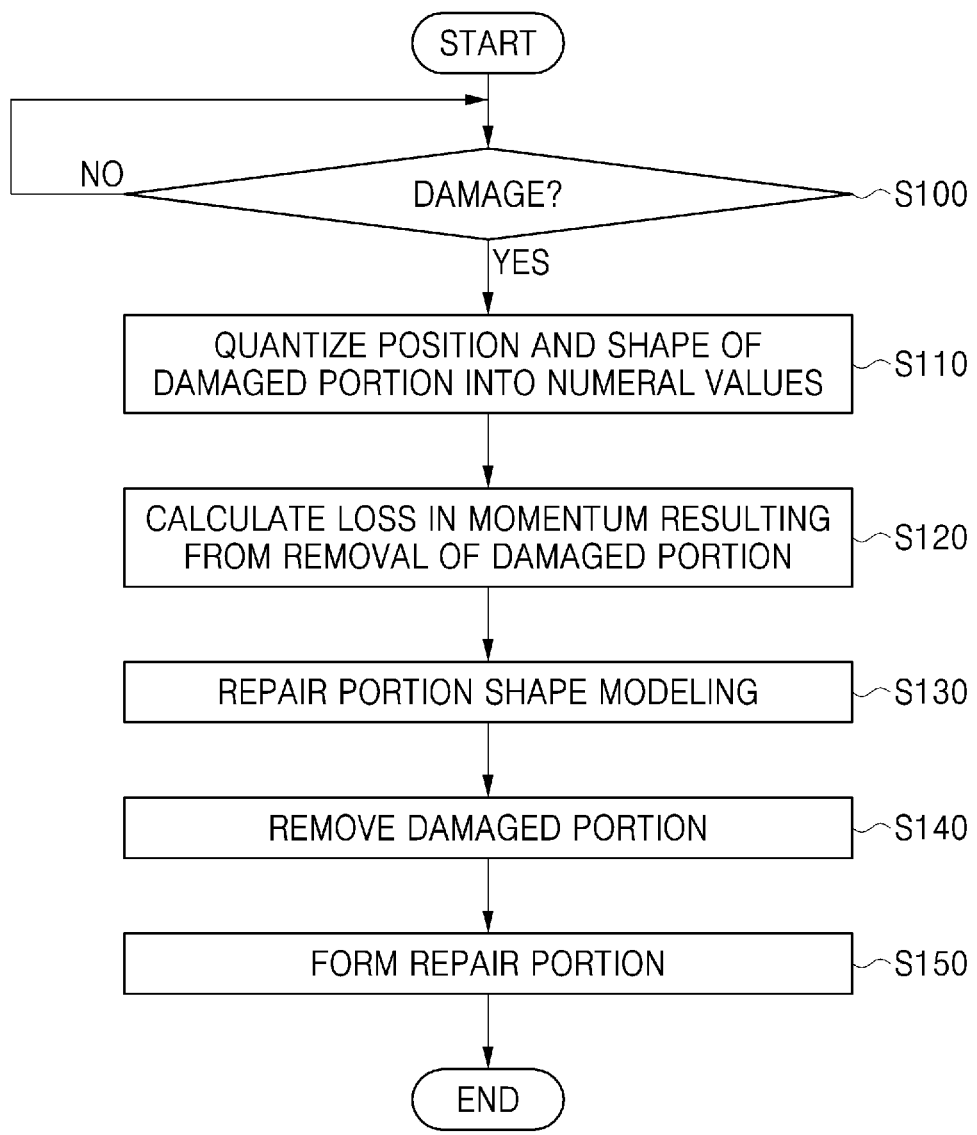
FIG. 5 is a flowchart illustrating a turbine blade repair method according to an exemplary embodiment.

FIG. 5 is a flowchart illustrating a turbine blade repair method according to an exemplary embodiment.

Referring to FIG. 5, if damage occurs to the blade portion 230 in operation S100, the position and the shape of a damaged portion are determined in operation S110. The term "damaged portion" used herein refers to a portion that is thermally damaged as well as a crack which is physically damaged.

For example, if the crack C occurs in the second squealer 233 as illustrated in FIG. 3, the position, the direction of propagation, the depth of the crack are determined and quantized into numerical values. For example, the position and the shape of the damaged portion may be accurately determined without damaging the blade portion 230 and may be expressed in numerical values in a space by performing a nondestructive test such as a radiation inspection test such as a computed tomography (CT) scan or an ultrasonic flaw detecting test.

When the determination on the damaged portion is completed, a momentum loss of the blade portion 230 due to the removal of the damaged portion is calculated (operation S120).

For example, if the position and the shape of the damaged portion are determined, a damaged portion removal method must be determined. That is, it is necessary to determine which portion of the blade portion 230 and to what extent to remove. For example, as illustrated in FIG. 3, the blade portion 230 may be cut along the A-A' line parallel to the shelf 235, thereby removing a portion of the blade portion 230 including the damaged portion (i.e., the crack C) above the line A-A'. In this case, the entire shelf 235 may be removed. Alternatively, only a portion of the shelf 235 may be removed by cutting the blade portion 230 along line B-B' to have a predetermine angle of inclination θ with respect to the shelf 235.

When the method of removing the damaged portion is determined as described above, a loss of the momentum of the blade portion 230 expected due to the removal of the damaged portion may be calculated.

The shape of the repair portion is modeled so that the calculated loss of the momentum may be compensated (operation S130). The term "repair portion" used herein refers to a portion newly added to the blade portion 230 by the repair process including a plurality of operations.

If the repair portion is made of the same material as the removed damaged portion, the repair portion may have the same shape as the removed damaged portion. Alternatively, the shape of the repair portion may be changed if the blade portion 230 has the same amount of momentum before and after the repair. For example, the blade portion 230 may be modeled such that an edge to which stress is to be concentrated is curved or the thickness of a specific portion is increased.

Alternatively, if the repair portion is made of a different material from the removed damaged portion, the shape of the repair portion must be modeled so that the blade portion 230 has the same amount of momentum before and after the repair.

If the modeling to the repair portion is completed, the damaged portion is removed in operation S140, and the portion from which the damaged portion is removed is repaired using additive manufacturing in operation S150.

Figure 6:
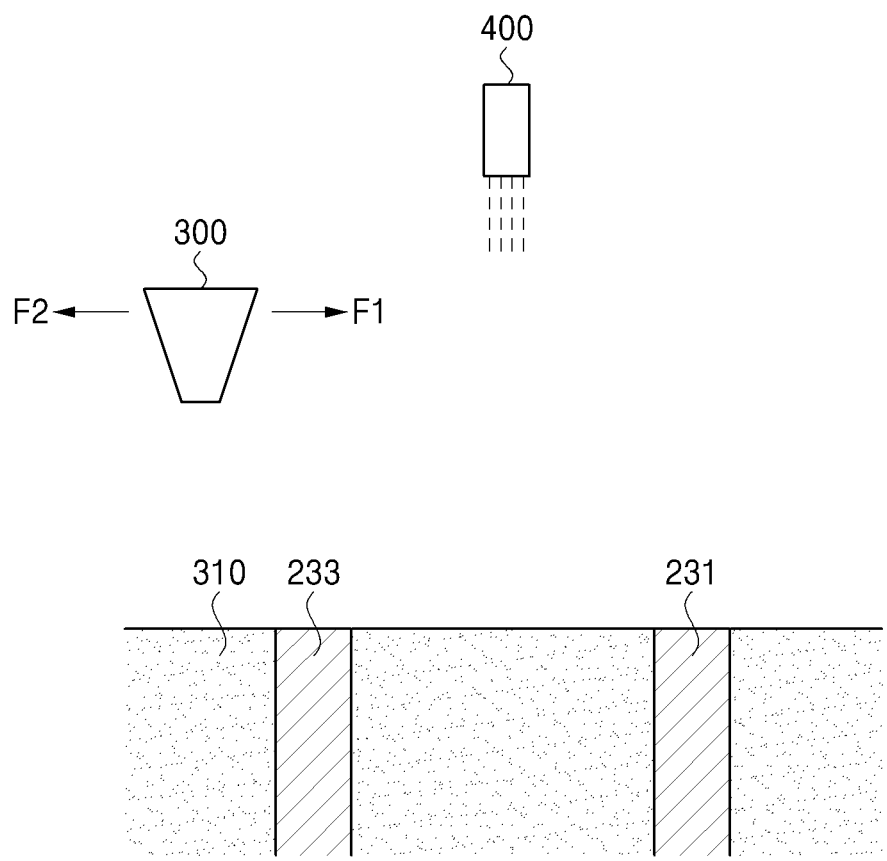
FIGS. 6 and 7 are views illustrating a first example of a process of forming a repair portion according to an exemplary embodiment.
Figure 7:
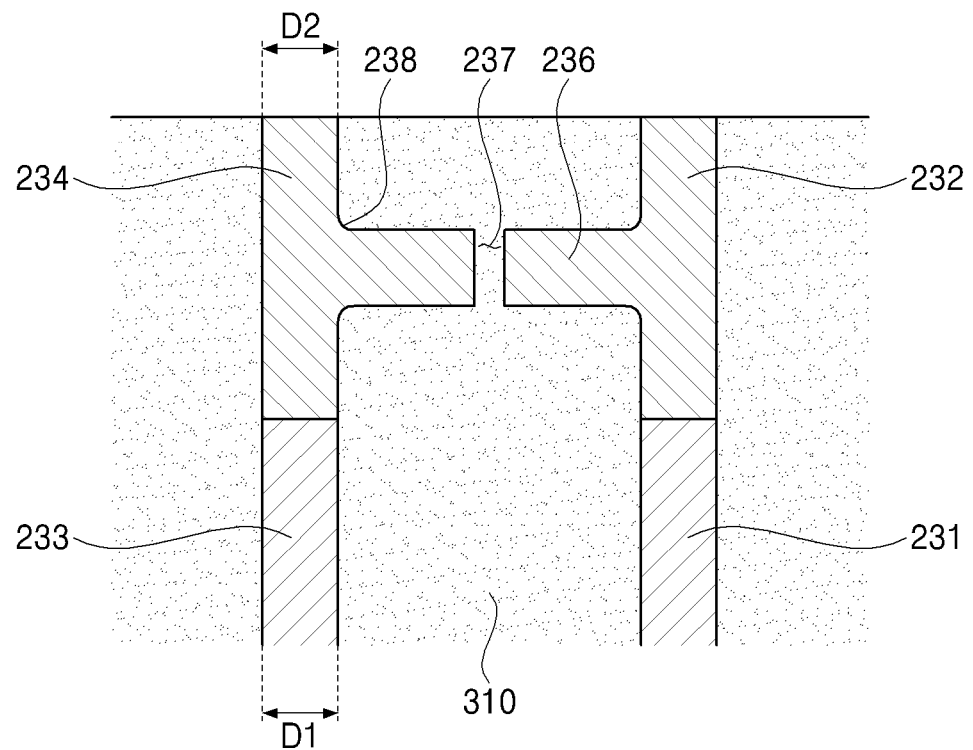
Figure 8:
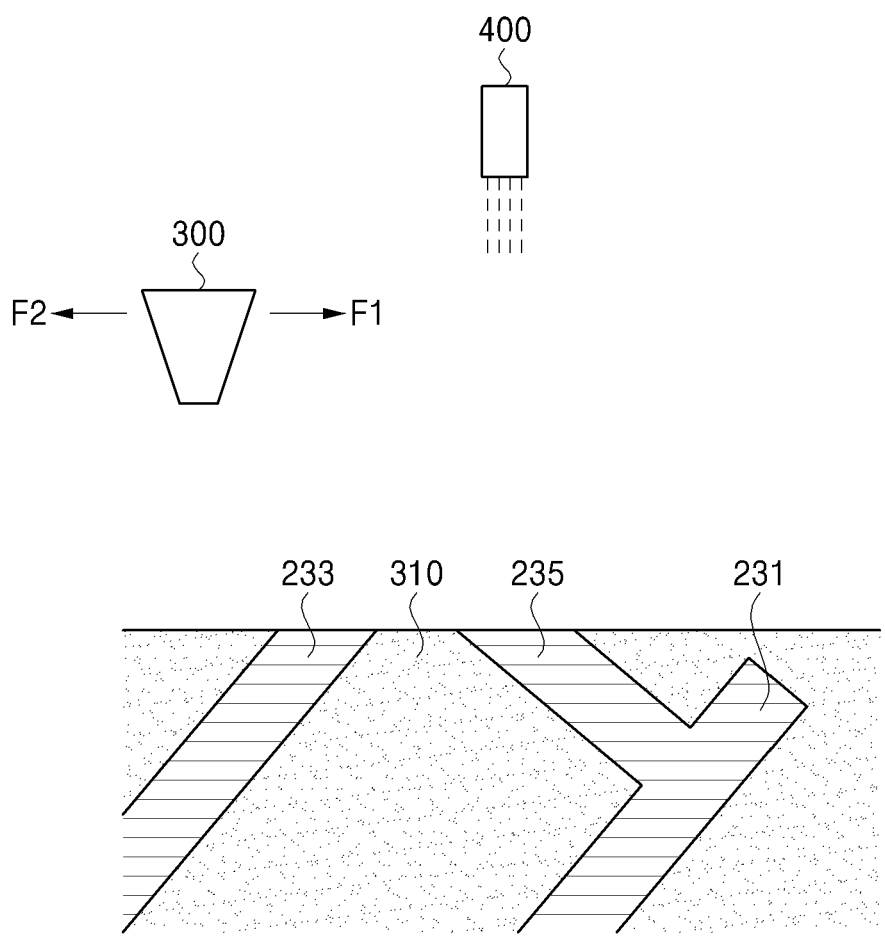
FIGS. 8 to 10 are views illustrating a second example of a process of forming a repair portion according to an exemplary embodiment.
Figure 9:
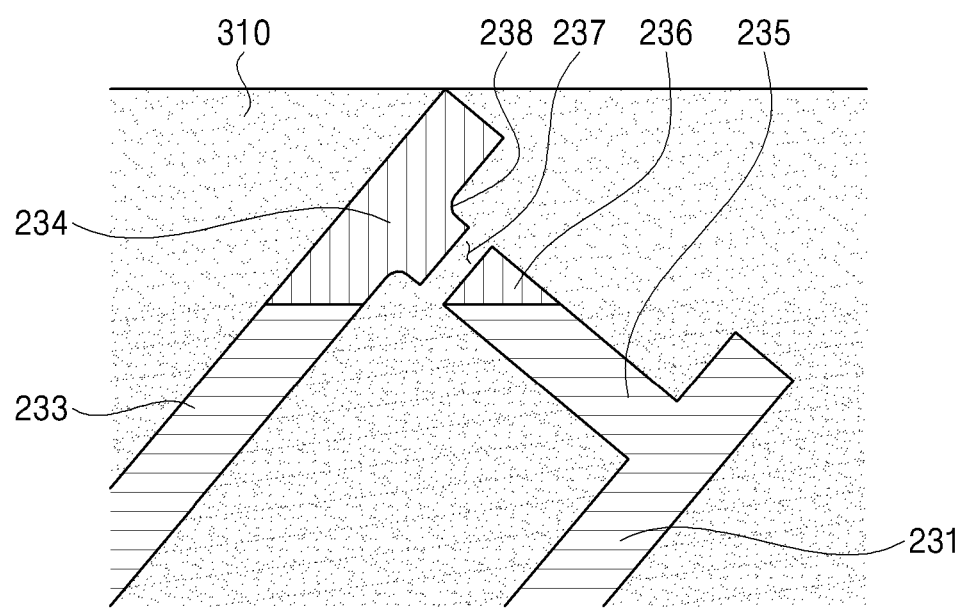
Figure 10:
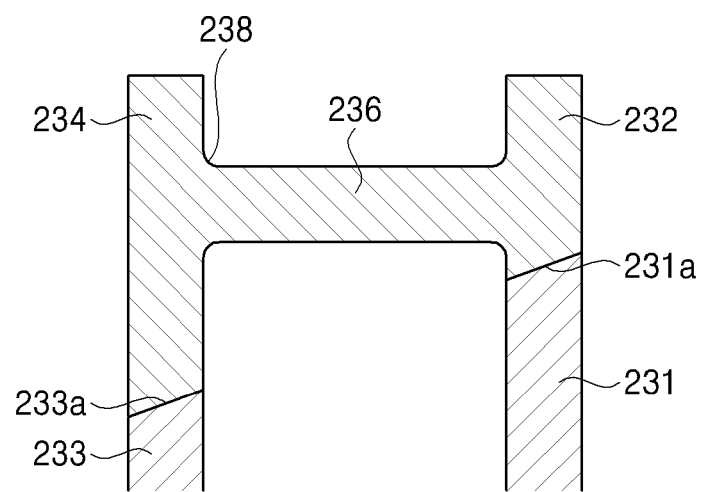

FIGS. 6 and 7 are views illustrating a first example of a process of forming a repair portion according to an exemplary embodiment. FIGS. 8 to 10 are views illustrating a second example of a process of forming a repair portion according to an exemplary embodiment.

The first example is a case in which the blade portion 230 illustrated in FIG. 3 is cut along the A-A' line parallel to the shelf 235, thereby removing the portion of the blade portion 230 above the A-A' line as a damaged portion. In this case, upper portions of the first squealer 231 and the second squealer 233 may be removed, and the entire shelf 235 may also be removed.

For example, the operation S150 of forming the repair portion may be performed by additive manufacturing.

Examples of the additive manufacturing may include selective laser sintering (SLS) and selective laser melting (SLM), both of which sinter or melt metal powder using a laser beam, electron beam melting (EBM) of melting metal powder using an electron beam, direct energy deposition (DED) of forming a metal deposit on a surface of an object by directly supplying metal powder or a metal wire to the surface of the object and applying energy thereto using a high power laser or the like, fused deposition modeling (FDM) of depositing a molten material, binder jetting (BJ) of forming a deposit by selectively jetting a liquid binder to metal powder using an inkjet head, and the like. Because these deposition methods form the repair portion by depositing layers one by one on the surface of the blade portion 230 from which the damaged portion is removed, the repair portion having a complicated shape may be easily formed. In addition, even when the blade portion 230 is made of a material which is difficult to machine such as superalloy or Ti, the repair portion may be made of the same material. The present disclosure is described using the EBM as an example.

Referring to FIG. 6, the blade portion 230 from which the damaged portion is removed is received within an electron beam melting device. In this case, the blade portion 230 is buried in metal powder 310. Here, the metal powder 310 may be made of the same material as the metal of the blade portion 230.

For example, metal powder is applied to the blade portion 230 to a predetermined thickness by moving a metal powder supplier 300 in forward and backward directions F1 and F2. Subsequently, the applied metal powder is selectively melted by emitting an electron beam from an electron beam gun 400 so that the molten metal powder matches the shape of the repair portion modeled in the operation S130, and the molten metal powder is cooled and solidified, thereby forming a portion of the repair portion. Thereafter, the blade portion 230, i.e., a target to be processed, is moved up and down to a predetermined height, and then the metal powder application and the electron beam emission are repeated. The repair portion is formed by repeating the above-described operations. The formed repair portion is illustrated in FIG. 7.

Referring to FIG. 7, the repair portion may include the third squealer 232 formed above the first squealer 231, the fourth squealer 234 formed above the second squealer 233, and the second shelf 236 connecting the third squealer 232 and the fourth squealer 234.

In this case, since the repair portion is made of the same material as the blade portion 230, the thickness of the first squealer 231 may be the same as the thickness of the third squealer 232, and a thickness D1 of the second squealer 233 may be the same as a thickness D2 of the fourth squealer 234. Also, the shape of the second shelf 236 may be the same as the shape of the shelf 235 before the repair process.

In addition, the repair may be performed by the EBM as described above, if the blade has a closed internal structure or it is difficult to remove the metal powder from inside of the blade even though the blade does not have a closed internal structure. In this case, it is necessary to remove the remaining metal powder 310 after the formation of the repair portion. To this end, an open area 237 is formed in the second shelf 236. Thus, after the EBM processing is finished, the metal powder 310 remaining inside the blade may be removed through the open area 237. Thereafter, the process of forming the repair portion may be completed by closing the open area 237 using a repair coupon, a soldering method, or the like. It is understood that the open area 237 formed in the second shelf 236 is not limited to example illustrated in FIG. 7, and may be changed or vary according to one or more other exemplary embodiments. The open area 237 may be formed in a proper position depending on the shape of the repair portion and the processing characteristics. For example, if the metal powder may be removed through a cooling channel or the like formed inside the blade under the shelf, an additional open area may not be formed.

In addition, stress concentration may occur at boundaries in which the squealers 232 and 234 join the second shelf 236. However, because it is possible to simply form a complicated shape using the additive manufacturing, the boundaries may be supplemented during the formation of the repair portion. For example, chamfers 238 may be formed at the boundaries in which the squealers 232 and 234 join the second shelf 236.

Here, the second shelf 236 is formed in a direction perpendicular to the third squealer 232 and the fourth squealer 234. Therefore, when using the additive manufacturing to form components by sequentially adding layers, a bottom end of the second shelf 236 may not be formed the same as designed.

In order to overcome this problem, the second shelf 236 may be modeled such that the bottom surface thereof has a curved shape. For example, the repair portion may be modeled such that the chamfers 238 on the bottom surface of the second shelf 236 are expanded so that the bottom surface of the second shelf 236 has a semicircular cross-section.

Alternatively, the additive manufacturing may be performed by inclining the blade portion 230 so that the repair portion does not have a horizontal component, according to a second example of a process of forming a repair portion. In other words, a cutting operation is performed by inclining the blade portion 230 at a predetermined angle of inclination θ, so that layers may be added without a significant change between the layers.

For example, as illustrated in FIG. 3, a portion of the blade portion 230 above the line B-B' is removed as a damaged portion by cutting the blade portion 230 along the line B-B' inclined at the angle of inclination θ with respect to the shelf 235. In this case, the upper portion of the second squealer 233 and a portion of the shelf 235 may be removed.

The angle of inclination θ may be appropriately selected depending on the shape of the repair portion. If squealers 231 and 233 are perpendicular to the shelf 235 as illustrated in FIG. 3, the angle of inclination θ may be set to be a range from 40° to 50°. There is no significant changes between the layers within this range of the angle of inclination, so the repair portion may be formed similar to the modeled one.

For example, depending on the change in the angle of inclination θ, only a portion of the shelf 235 may be removed as illustrated in FIG. 9, or entire shelf 235 may be removed as illustrated in FIG. 10. A size of the angle of inclination θ may be appropriately selected in consideration of a size and direction of the damaged portion, a shape and material of the repair portion, and a specific method of additive manufacturing.

Referring to FIG. 9, the repair portion may include the fourth squealer 234 formed above the second squealer 233 and the second shelf 236 connecting the fourth squealer 234 and the remaining shelf 235 which is not removed.

In this case, the repair portion is made of the same material as the blade portion 230. Thus, the fourth squealer 234 may have the same thickness as the second squealer 233, and the second shelf 236 may have the same thickness as the shelf 235. In addition, the blade portion 230 may maintain the same momentum before and after the repair.

Further, as in the first exemplary embodiment, the second shelf 236 may include an open area 237 through which the metal powder 310 is removed. In addition, a chamfer 238 may be formed at a boundary in which the fourth squealer 234 joins the second shelf 236 to prevent stress concentration.

As described above, the turbine blade repair method according to one or more exemplary embodiments may use additive manufacturing (AD) to easily repair a damaged turbine blade using a material which is difficult to machine such as superalloy or Ti. For example, the turbine blade may be repaired to have the same shape regardless of the position or size of the damaged portion, and the momentum of the turbine blade may be maintained the same before and after the repair.

In addition, because the shape of the repair portion may be properly changed while maintaining the same amount of momentum, the performance of the turbine blade may be improved by, for example, removing stress concentration.

In addition, a secondary structure 500 configured to increase strength and optimize frequency response characteristics may be attached to a blade portion 184c. In this regard, the present disclosure provides another exemplary embodiment of the turbine blade repair method for forming a secondary structure in a single-crystal structure. The term "secondary structure" used herein refers to a group of components configured to be attached after the manufacture of the blade portion 184c.

Figure 11:
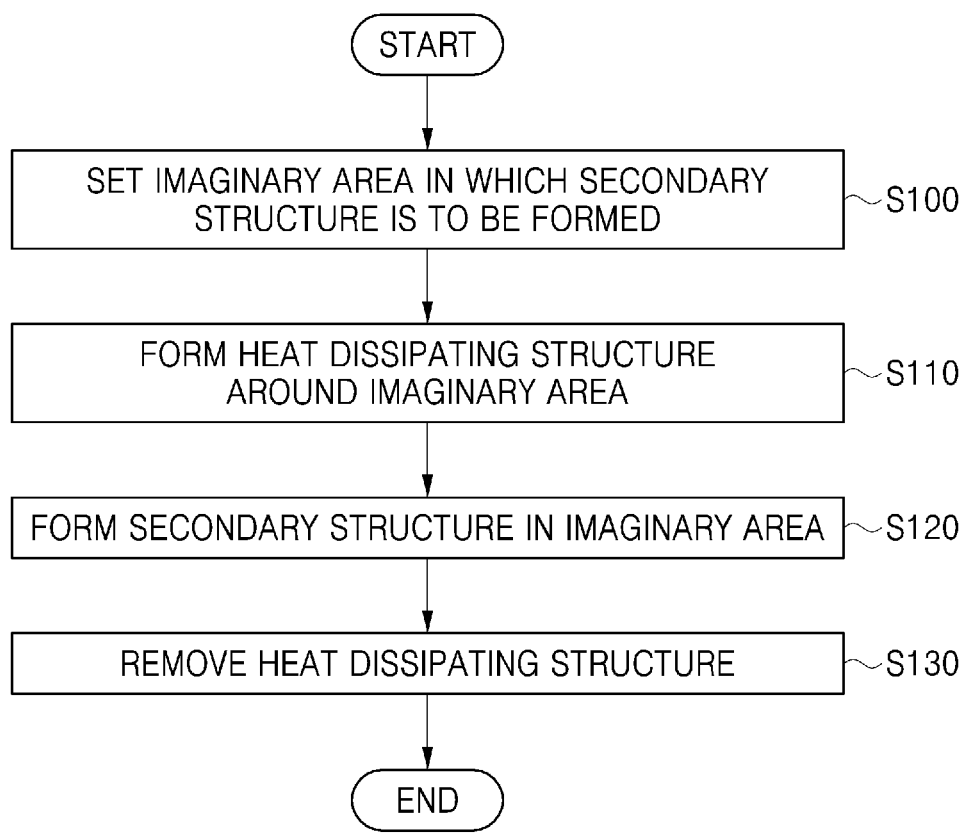
FIG. 11 is a flowchart illustrating steps of a turbine blade repair method of forming a secondary structure on a single-crystal structure according to an exemplary embodiment.
Figure 17:
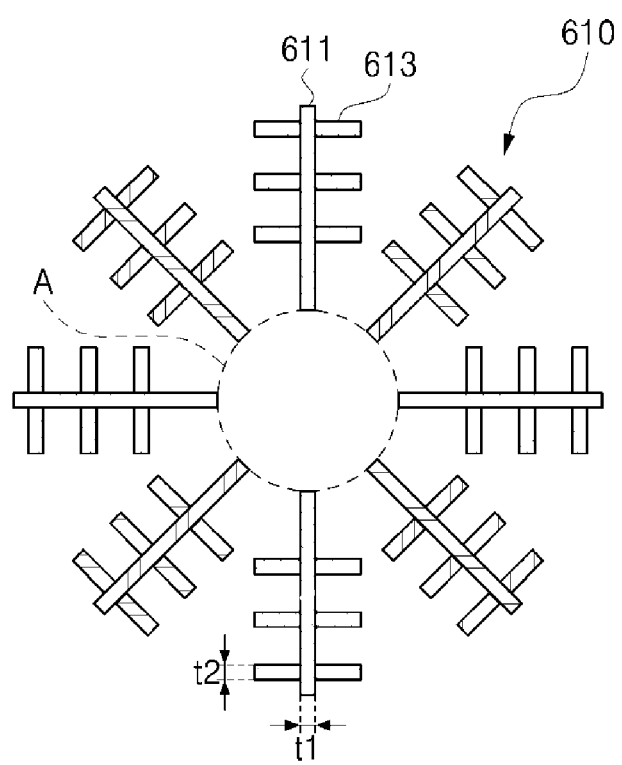
FIG. 17 is a view illustrating a heat dissipating structure according to another exemplary embodiment.
Figure 18:
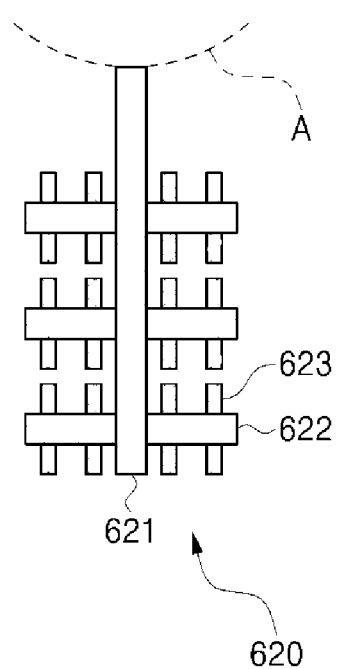
FIG. 18 is a view illustrating a heat dissipating structure according to another exemplary embodiment.

Hereinafter, the repair method of forming the secondary structure 500 on the turbine blade will be described with reference to FIGS. 11 to 18. FIG. 11 is a flowchart illustrating steps of the turbine blade repair method of forming a secondary structure on a single-crystal structure according to an exemplary embodiment, FIGS. 12A to 16 are views illustrating the steps illustrated in FIG. 11, FIG. 17 is a view illustrating a heat dissipating structure according to another exemplary embodiment, and FIG. 18 is a view illustrating a heat dissipating structure according to another exemplary embodiment.

Figure 12A:
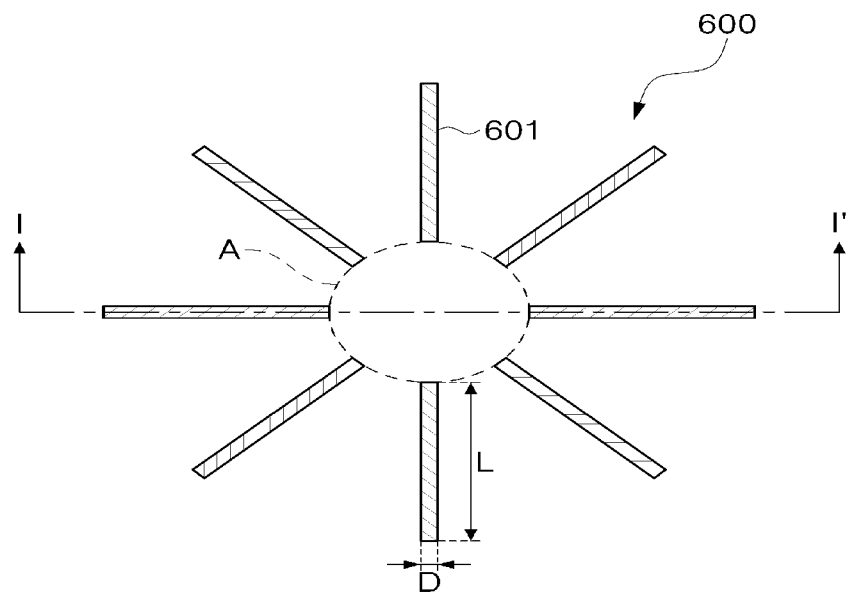
FIGS. 12A to 16 are views illustrating the steps illustrated in FIG. 11.
Figure 12B:
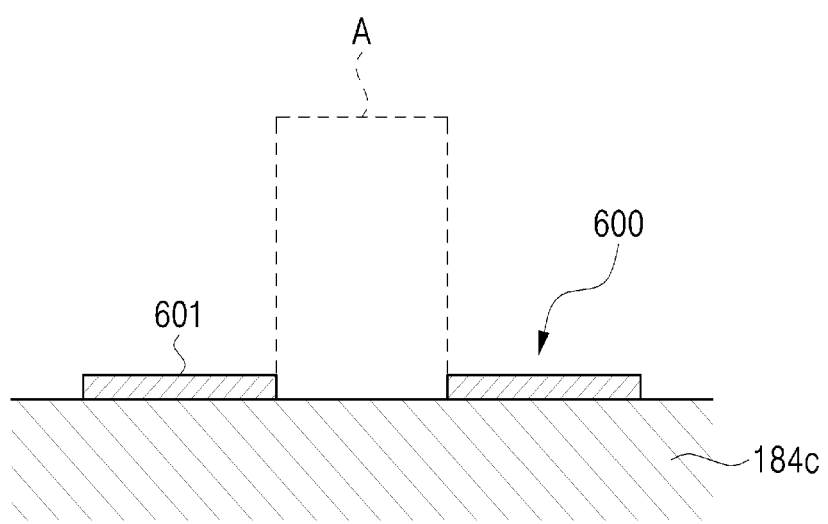

Referring to FIGS. 11, 12A, and 12B, an imaginary area A in which the secondary structure 500 is to be formed is set on the blade portion 184c of the turbine blade 200 (operation S100).

For example, the position, the size, and the material of the secondary structure 500 may be determined in consideration of factors such as a flow and temperature of a fluid in the turbine section 120 or strength and frequency response characteristics of the blade portion 184c. The imaginary area A in which the secondary structure 500 is to be formed may be set on the surface of the blade portion 184c depending on determined specification.

If the imaginary area A is set, a heat dissipating structure 600 is provided around the imaginary area A in operation S110.

Here, the heat dissipating structure 600 may include a plurality of heat dissipating fins 601 radially extending from the imaginary area A. The plurality of heat dissipating fins 601 are illustrated in FIGS. 12A and 12B. FIG. 12A is a plan view of the heat dissipating structure 600, and FIG. 12B is a cross-sectional view of the heat dissipating structure 600 taken along the line I-I' in FIG. 12A.

The plurality of heat dissipating fins 601 are disposed around the imaginary area A to be spaced apart from each other. Each of the heat dissipating fins 601 may have a predetermined width D and a length L. Because the plurality of heat dissipating fins 601 are radially arranged, each of the plurality of heat dissipating fins 601 may be configured such that the length L is greater than the width D to minimize the interference between adjacent heat dissipating fins 601.

Here, the width D of the heat dissipating fin 601 may be 0.2 mm or greater. If the width D of the heat dissipating fin 601 is excessively small, it may be difficult to form a pattern and a heat dissipation effect may be reduced. On the other hand, if the width D of the heat dissipating fin 601 is too large, heat inside the heat dissipating fins 601 may not be effectively dissipated and adjacent heat dissipating fins 601 may interfere with each other. Therefore, the shape of each heat dissipating fin 601 may be designed such that the width D and the length L have appropriate values.

The plurality of heat dissipating fins 601 may be formed by additive manufacturing (AM). Examples of the additive manufacturing may include selective laser sintering (SLS) and selective laser melting (SLM), both of which sinter or melt metal powder using a laser beam, electron beam melting (EBM) of melting metal powder using an electron beam, direct energy deposition (DED) of forming a metal deposit on the surface of an object by directly supplying metal powder or a metal wire to the surface of the object and applying energy thereto using a high power laser or the like, fused deposition modeling (FDM) of depositing a molten material, and the like. In this deposition method, because the secondary structure 500, which is a final product, is formed by depositing layers one by one on the surface of the blade portion 184c, the plurality of heat dissipating fins 601 having a complicated shape may be easily formed.

Alternatively, the plurality of heat dissipating fins 601 may be formed by forming a heat dissipating layer having a predetermined thickness on the blade portion 184c using a well-known deposition process and forming an intended pattern of the heat dissipating fins 601 by etching the heat dissipating layer.

Because the heat dissipating structure 600 is a portion to be removed after the secondary structure 500 is formed, the heat dissipating structure 600 may be made of a material that is easily removable and has excellent heat transfer characteristic. An example of the material may be copper (Cu) or aluminum (Al). This material may rapidly dissipate thermal impact that occurs during the formation of the secondary structure 500 due to high thermal conductivity thereof. In addition, after forming the secondary structure 500, this material may be easily removed by applying heat thereto or simple mechanical processing such as cutting because the melting point is low.

After the heat dissipating structure 600 is formed on the blade portion 184c around the imaginary area A, the secondary structure 500 is formed in the imaginary area A in operation S120.

The secondary structure 500 may be made of the same material as the blade portion 184c or may be made of a different material from the blade portion 184c as required. Because the blade portion 184c is made of a material which is difficult to machine, such as superalloy or Ti, the secondary structure 500 may also be formed of the same material or a similar material as the blade portion 184c such as superalloy or Ti.

In this case, the secondary structure 500 may be formed by additive manufacturing (AM). Examples of the additive manufacturing may include selective laser sintering (SLS), selective laser melting (SLM), electron beam melting (EBM), direct energy deposition (DED), fused deposition modeling (FDM), and the like.

Figure 13:
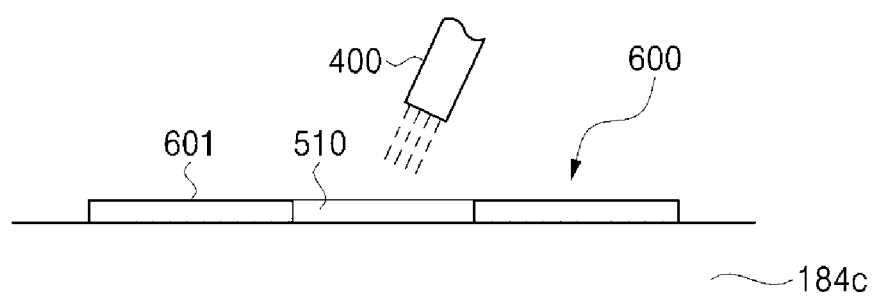

Referring to FIG. 13, the selective laser sintering (SLS) may form a layer 510 by applying metal powder to the imaginary area A between the heat dissipating fins 601 of the heat dissipating structure 600 and emitting beams to the metal powder from a directional laser 400. During this process, residual heat remaining after the layer 510 is formed may be dissipated to outside through the heat dissipating structure 600. Accordingly, heat applied to the formation of the layer 510 of the secondary structure 500 may be easily removed, and thermal impact applied to the blade portion 184c may be minimized.

Figure 14A:
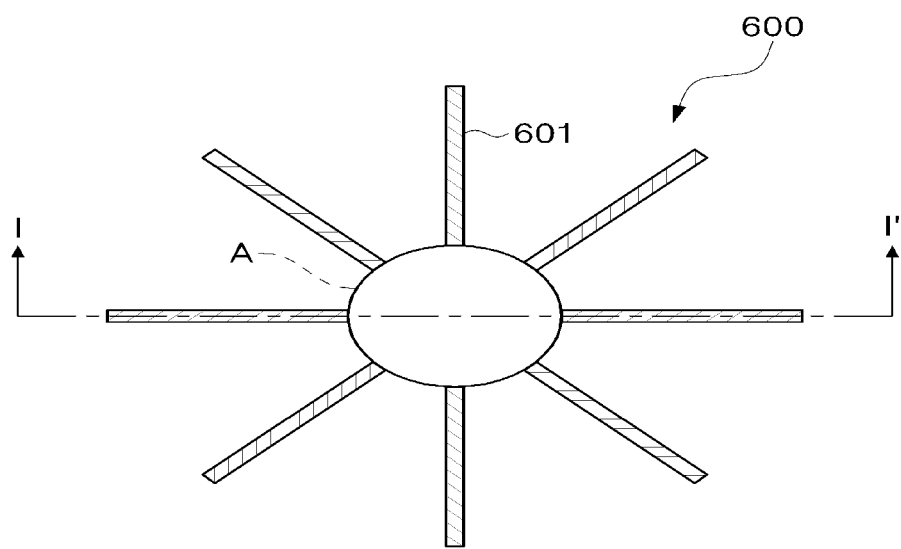
Figure 14B:
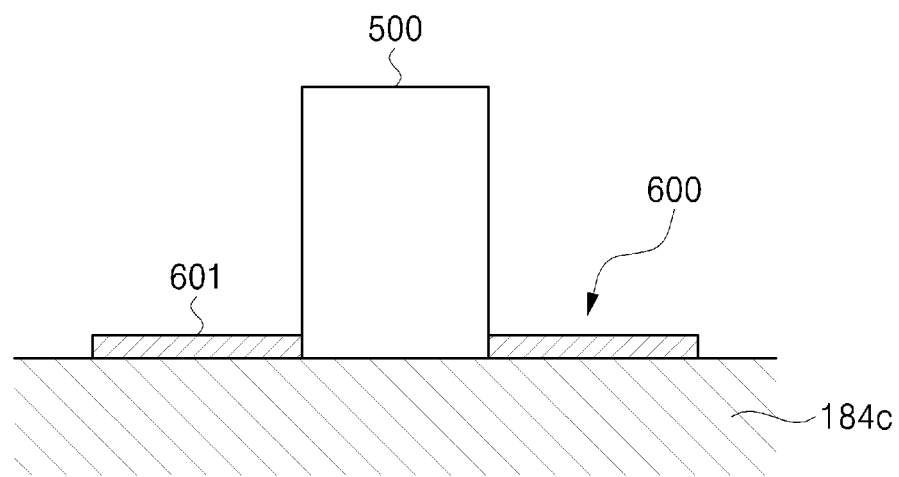

Thereafter, other layers are sequentially added on the layer 510 by repeating the powder application and the laser beam emission. As a result, the secondary structure 500 may be formed in the imaginary area A, as illustrated in FIGS. 14A and 14B. FIG. 14A is a plan view of the heat dissipating structure 600, and FIG. 14B is a cross-sectional view of the heat dissipating structure 600 taken along the line I-I' in FIG. 14A.

According to the exemplary embodiment, heat dissipating fins 601 and 602 may be formed whenever layers 510 and 520 are formed.

Figure 15:
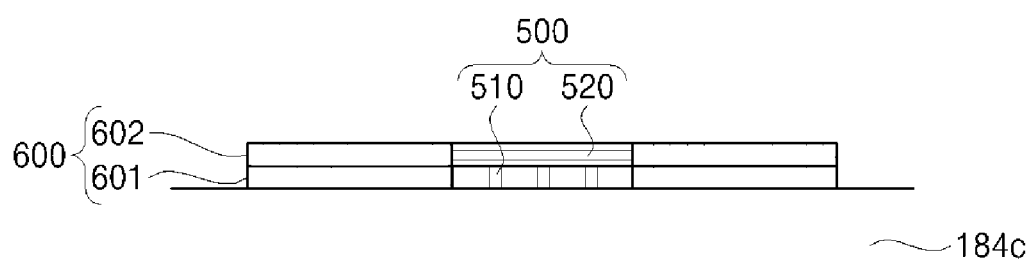

Referring to FIG. 15, the layer 510 is formed between the heat dissipating fins 601, and the second heat dissipating fins 602 are formed on the heat dissipating fins 601. Thereafter, the second layer 520 may be formed between the second heat dissipating fins 602. Thereafter, the secondary structure 500 may be formed by repeating the operation of forming the heat dissipating fin and the operation of forming the layer. In this case, because the areas in which the layers 510 and 520 are formed are in constant contact with the heat dissipating fins 601 and 602, thermal impact may be dissipated more effectively.

In case of direct energy deposition (DED), the operation of applying metal powder may be omitted. That is, the heat dissipating structure 600 and the secondary structure 500 may be formed by supplying metal powder or a metal wire instead of applying metal powder in advance and applying energy using a high power laser or the like.

Figure 16:
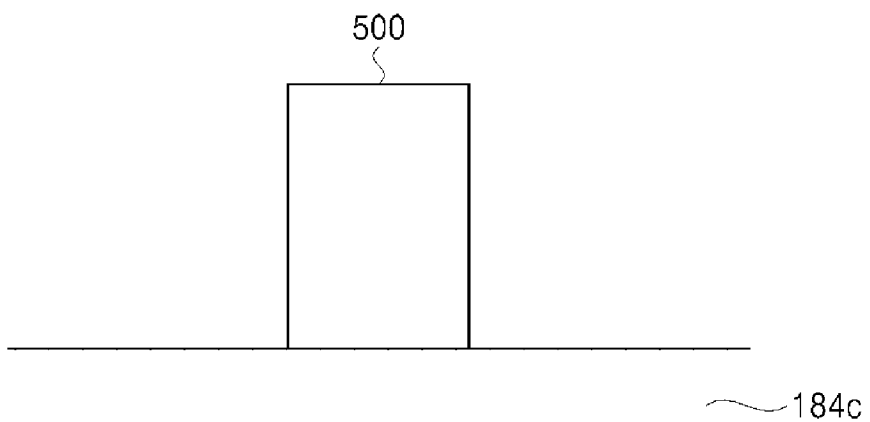

Referring to FIGS. 11 and 16, if the formation of the secondary structure 500 is completed, the heat dissipating structure 600 is selectively removed in operation S130.

For example, the heat dissipating structure 600 may be removed from the surface of the blade portion 184c by heating the heat dissipating structure 600 to melt. In detail, the melting point of the secondary structure 500 made of a nickel (Ni)-based alloy is 1450° C. or higher, while the heat dissipating structure 600 made of Cu has a relatively low melting point of 1084° C. Therefore, it is possible to selectively melt the heat dissipating structure 600 by applying heat at about 1100° C.

Alternatively, the heat dissipating structure 600 may be removed using a related art mechanical machining method, such as cutting, or may be selectively removed using a chemical method.

As illustrated in FIG. 16, by selectively removing the heat dissipating structure 600 as described above, the secondary structure 500 may be stably formed on a single-crystal structure such as the blade portion 184c.

According to the method of repairing a turbine blade by forming a secondary structure on a single-crystal structure according to the exemplary embodiment, the secondary structure 500 is formed after the previous formation of the heat dissipating structure 600 which is easily removable. Therefore, it is possible to effectively dissipate the heat generated during the formation of the secondary structure 500 to the outside. Accordingly, when forming the secondary structure 500 on the single-crystal structure, it is possible to minimize thermal impact applied to the single-crystal structure.

In addition, the larger the area of the heat dissipating structure 600, the more advantageous it may be to obtain the maximum heat transfer effect by using the heat dissipating structure 600 in the formation of the secondary structure 500.

Referring to FIG. 17, a heat dissipating structure 610 may include a plurality of first heat dissipating fins 611 radially extending from an imaginary area A and a plurality of second heat dissipating fins 613 each extending in a transverse direction from a corresponding first heat dissipating fin 611 among the plurality of first heat dissipating fins 611.

The first heat dissipating fins 611 and the second heat dissipating fins 613 may be formed of the same material or may be formed of different materials as required.

In addition, a width t1 of each of the first heat dissipating fins 611 may be 0.2 mm or greater, and a width t2 of each of the second heat dissipating fins 613 may be 0.2 mm or greater.

In the process, the first heat dissipating fins 611 may be formed before the second heat dissipating fins 613 are formed, or the first heat dissipating fins 611 and the second heat dissipating fins 613 may be formed at the same time. This may be appropriately selected depending on the characteristics of a selected manufacturing process. For example, if the first heat dissipating fins 611 and the second heat dissipating fins 613 are made of the same material, the first heat dissipating fins 611 and the second heat dissipating fins 613 may be simultaneously formed using selective laser sintering (SLS). Alternatively, if the first heat dissipating fins 611 and the second heat dissipating fins 613 are made of different materials, it may be more advantageous to form the first heat dissipating fins 611 before forming the second heat dissipating fins 613, in terms of process simplification and cost.

Referring to FIG. 18, a heat dissipating structure 620 may include a plurality of first heat dissipating fins 621 radially extending from the imaginary area A, a plurality of second heat dissipating fins 622 each extending in a transverse direction from a corresponding first heat dissipating fin 621 among the plurality of first heat dissipating fins 621, and a plurality of third heat dissipating fins 623 each extending in the transverse direction from a corresponding second heat dissipating fin 622 among the plurality of second heat dissipating fins 622.

The first to third heat dissipating fins 621, 622, and 623 may be made of the same material or may be made of different materials as required. In addition, a width of each of the first to third heat dissipating fins 621, 622, and 623 may be 0.2 mm or greater for effective heat dissipation. Further, the first to third heat dissipating fins 621, 622, and 623 may be formed at the same time, or may be sequentially formed depending on the characteristics of the manufacturing process.

In the turbine blade repair method using additive manufacturing according to the exemplary embodiments, heat generated during formation of the secondary structure may be effectively dissipated to the outside by forming a secondary structure after forming a heat dissipating structure that is easy to remove in advance. Accordingly, by forming the secondary structure in the single-crystal structure of the turbine blade, it is possible to minimize thermal impact applied to the single-crystal structure.

While exemplary embodiments have been described with reference to the accompanying drawings, it will be apparent to those skilled in the art that various modifications in form and details may be made therein without departing from the spirit and scope as defined in the appended claims. Therefore, the description of the exemplary embodiments should be construed in a descriptive sense and not to limit the scope of the claims, and many alternatives, modifications, and variations will be apparent to those skilled in the art.

What is claimed is:

1. A turbine blade repair method using additive manufacturing, the method comprising:
    setting an imaginary area in which a secondary structure is formed in a single-crystal structure;
    forming a heat dissipating structure on the single-crystal structure, wherein the heat dissipating structure comprises a plurality of heat dissipating fins extending radially from the set imaginary area;
    forming a secondary structure in the imaginary area; and
    removing the heat dissipating structure.

2. The method of claim 1, wherein the forming of the secondary structure is performed by the additive manufacturing.

3. The method of claim 2, wherein the additive manufacturing comprises a process selected from among selective laser sintering, selective laser melting, electron beam melting, direct energy deposition, and fused deposition modeling.

4. The method of claim 1, wherein the heat dissipating structure is made of a material having a lower melting point than the secondary structure.

5. The method of claim 4, wherein the removing of the heat dissipating structure comprises selectively melting the heat dissipating structure by heating the heat dissipating structure.

6. The method of claim 4, wherein the heat dissipating structure comprises copper.

7. The method of claim 1, wherein each of the plurality of heat dissipating fins extending from the imaginary area has a length greater than a width, and the width is 0.2 mm or greater.

8. The method of claim 1, wherein the forming of the heat dissipating structure comprises:
    forming a plurality of first heat dissipating fins extending radially from the set imaginary area; and
    forming a plurality of second heat dissipating fins each extending in a transverse direction from a corresponding first heat dissipating fin among the plurality of first heat dissipating fins.

9. The method of claim 8, wherein the forming of the heat dissipating structure further comprises forming a plurality of third heat dissipating fins each extending in the transverse direction from a corresponding second heat dissipating fin among the plurality of second heat dissipating fins.

10. The method of claim 1, wherein the single-crystal structure comprises a turbine blade of a gas turbine.

* * * * *